United States Patent [19]

Wenzel

[11] Patent Number: 5,127,215
[45] Date of Patent: Jul. 7, 1992

[54] DUAL HYDROSTATIC DRIVE WALK-BEHIND MOWER

[75] Inventor: Philip H. Wenzel, Vernon Center, N.Y.

[73] Assignee: Ferris Industries, Inc., Oneida, N.Y.

[21] Appl. No.: 578,147

[22] Filed: Sep. 6, 1990

[51] Int. Cl.$^5$ .................................... A01D 34/68
[52] U.S. Cl. .................................... 56/11.1; 56/11.3; 56/11.5; 180/6.32; 180/19.1
[58] Field of Search .................... 56/11.1, 11.2, 11.3, 56/11.4, 11.8, 17.6, DIG. 18, DIG. 6, 11.5; 180/6.2, 6.24, 6.32, 6.34, 6.48, 19.1, 19.2

[56] References Cited

U.S. PATENT DOCUMENTS

| | | | |
|---|---|---|---|
| 2,925,134 | 2/1960 | Cunningham, Jr. | 180/19.1 X |
| 4,809,796 | 3/1989 | Yamaoka et al. | 180/6.48 |
| 4,878,339 | 11/1989 | Marier et al. | 180/19.1 X |
| 4,920,734 | 5/1990 | Wenzel | 56/11.1 |
| 4,920,735 | 5/1990 | Berrius | 56/10.9 |
| 4,991,382 | 2/1991 | Scag | 56/11.2 X |
| 5,020,308 | 6/1991 | Braun et al. | 56/11.3 |
| 5,077,959 | 1/1992 | Wenzel | 56/11.1 |

OTHER PUBLICATIONS

Scag Power Equipment, "New Scag Zero-Turn Walker" (sales brochure) 1989.

Primary Examiner—David J. Bagnell
Attorney, Agent, or Firm—Wall and Roehrig

[57] ABSTRACT

An extra-wide self-propelled lawn mower employs twin hydrostatic transmissions to power the left and right rear drive wheels that are situated behind a forward moving deck. Hydrostatic drives have infinitely variable adjustment speed from reverse through neutral, to a maximum forward speed. There are also independent left and right control levers mounted adjacent the hand grips that are coupled through linkages to control levers for the respective hydrostatic transmissions. An engine has its center of gravity situated behind the drive wheel axles to balance the weight of the moving deck. Spring returns associated respectively with the two hydrostatic transmissions return the same to the neutral position when an operator releases the respective control levers.

7 Claims, 2 Drawing Sheets

DUAL HYDROSTATIC DRIVE WALK-BEHIND MOWER

BACKGROUND OF THE INVENTION

This invention relates to self-propelled institutional or commercial type lawn mowers, and is especially directed to large lawn mowers intended for extended service on a daily basis, e.g. by commercial landscape gardeners or ground maintenance personnel responsible for attending to lawns at corporate or government office parks, golf courses, condominiums, and the like. The invention is especially directed to walk-behind and sulky-type riding mowers in which there is an operator position situated behind the mowing mechanism.

At present, most lawn mowers of this type employ belt drives both for the mower blade and for the drive wheels. In these current mowers, each wheel is belt driven and is provided with a clutch and an individual wheel-brake which are intimately linked. The belts wear out quickly and the drive thus has a high maintenance rate. The belts also tend to slip when the grass is wet. Changing speeds requires disengaging both belts by squeezing hand calipers found on each handle bar. A speed selector control must then be adjusted to effect speed change. Because these actions take considerable time to accomplish, the operator usually opts not to make speed changes. This, however, renders precision mowing near obstacles difficult or impossible. Consequently, an intolerable amount of follow-up mowing with a hand mower or trimmer is usually required The operator must also release his grip on the steering controls when making various machine adjustments; this can and often does lead to an accident.

These same hand calipers when squeezed to their maximum positions engage a brake which is used for turning purposes. Because the hand calipers are spring controlled, they require considerable hand pressure to engage. This continuous hand pressure is extremely tiring. Due to the direct-drive, nondifferential type axle, almost continuous squeezing is required to keep the mower steered in the proper direction.

Previous walk-behind mowers generally do not have a reverse speed. Because of the excessive weight distribution, manual backing of the mower is extremely tiring on the operator and is often dangerous.

An improved mower that employs a hydrostatic transmission has been proposed in U.S. Pat. No. 4,787,195. That patent describes a self-propelled lawn mower that has a mowing deck that supports one or more blades. A pair of drive wheels are rotatably supported in a power deck located behind the mowing deck. Drive linkages convey power from an engine mounted upon the power deck to the rear drive wheels and also to a blade drive system for rotating the mowing blades An operator position is situated rearward of the drive wheels. The mower includes handle arrangement behind the drive wheels with operator controls mounted on the handle for selectively controlling the speed and direction of the drive wheels. In the mower of that patent, a hydrostatic transmission has an input shaft driven by the engine, and output shaft arranged to turn the drive wheels, and a control shaft that is rotated to control the ratio of the output shaft speed to the input shaft speed in a continuous range of speeds from reverse, through neutral, to maximum forward speed. The operator controls include a transmission control lever that is connected, for example, via a cable or a rigid linkage, to the control shaft of the hydrostatic transmission to enable the operator to select a desired drive wheel speed without removing his or her hand from the steering handle. The input shaft of the hydrostatic transmission can be vertically disposed, and the control shaft is either vertically or transversely disposed. A control lever for the hydrostatic transmission can be a C-shaped or L-shaped member that is connected at one end to the control shaft, with a control cable connected between the control handle and this member. A cooling fan can be mounted on the shaft of the hydrostatic transmission for air cooling the same. The drive wheels are connected to the hydrostatic transmission through a differential-type drive system whose differential right and left output shafts serve as axles on which the drive wheels are mounted. These output shafts are provided with independent right and left disk brakes, with separately actuated operating levers, so that the operator can brake the wheels independently for precision steering of the mower.

The engine is mounted with its center of gravity rearward of the drive wheel shaft, to serve as a counterweight or counterpoise to balance the weight of the mowing deck. Consequently, the mower center of gravity is disposed at or close to the drive wheel axle. This aids traction significantly and facilitates steering of the machine.

The small to medium size hydrostatic-drive mower can be steered in either of two ways:

1. Because of the differential drive, the operator can simply apply body weight to the handle bars to make directional changes. This is impossible with previous mowers because their wheels are not differentially coupled to the drive shaft.

2. Each wheel is fitted with a disk brake which is engaged by means of a hand lever on a correspondingly handle grip.

Engaging the disk brake is much easier than engaging the hand brake on other mowers because there is no spring-actuated clutch in the disk brake linkage.

Squeezing a selected hand caliper to engage one of the disk brakes results in an almost effortless turn toward the braked-wheel side of the machine.

These mowers can quickly turn one-hundred-eighty degrees to mow a row alongside a just-mowed row. To do this, the operator simply squeezes one brake lever, and releases the grip of the other hand. The differential drive then pulls the mower around and, and when turned, the operator simply releases the brake lever and resumes mowing.

Unfortunately, the effect of the differential drive is to transfer all of the power to the unbraked wheel at double the wheel speed that was experienced when both wheels were unbraked. This makes the mower rather difficult to control, unless the transmission control can be moved to a lower setting to keep the wheel speed even. However, in the arrangement of U.S. Pat. No. 4,787,195, the control lever is on one side of the handle bar, the operator can effect a hand brake turn only in one direction, i.e. only to the right where the control lever is mounted near the right hand grip.

An improved mower, controls are provided on both the right and left hand grips for controlling the speed of the hydrostatic transmission drive to the rear wheels, as described in U.S. Pat. No. 4,920,734. That mower has independent right and left disk brakes and a hydrostatic transmission which is driven by the mower's engine and an output that is connected through a differential drive to the right and left rear wheels. The control mechanism includes a pair of operating levers on the handle grips with a linkage connecting both operating levers to the speed regulator of the hydrostatic transmission. The operator can adjust the speed setting of the hydrostatic transmission using either hand without having to release his or her hands from the hand grips and without having to uncouple the transmission from the engine.

The control mechanism comprises a pair of thumb levers pivotally mounted on the handle bar assembly adjacent the respective hand grips. These are pushed forward to move the hydrostatic transmission to a forward speed, and are pulled back to move the hydrostatic transmission to a reverse speed. The two levers are each linked through a common linkage to the actuator of the transmission, so that the speed can be controlled with either lever. This permits effective one-hand braking and speed control so that the operator can carry out a high-speed hand-brake turn without relinquishing the control over wheel speed. This advantage comes about because the operator can reduce the operating wheel speed, by backing off the thumb lever slightly, to counter the effect of the differential, which would otherwise double the speed of the unbraked, outer wheel.

The control assembly linkage can include a pivot rod mounted transversely beneath the mowing deck with arms that are coupled through rigid connecting rods to the thumb levers. Another arm on this pivot rod is coupled through a connecting rod to the actuator levers for the hydrostatic transmission. Motion of either or both thumb lever will rotate the pivot rod and move the actuator lever. A spring return on the mower is connected to the actuator lever so that the actuator lever will seek neutral as soon as the thumb levers are released.

The thumb levers are somewhat spoon shaped, i.e., bent forward and then extending upward and are adjustably mounted on a rocker plate so that they can accommodate different hand sizes. This arrangement permits the operator to provide continuous pressure on the lever without significant fatigue. Also, for safety considerations, backing the mower requires pulling back on the lever or levers, and rearward motion stops as soon as the control levers are released.

A belt-loop-coil operator presence switch can be included to shut the mower down if the operator loses control of the mower.

This system works well for small to medium size commercial mowers (36 inches to 48 inches width). However, for larger mowers (e.g., 52 inches or wider) it is more convenient for the operator to control the speed to each drive wheel individually. In many locations, especially where the terrain is not level, more power has to be applied to one wheel or the other to keep the mower moving straight ahead. On a slope, the mower has a tendency to turn downhill. If the mower is of the larger type, the mower is often far too heavy for the operator simply to manhandle; braking the uphill side to control the direction is not precise, and also causes rapid wear of brake pads.

One extra-wide walk-behind mower has recently been proposed with a dual hydraulic drive system, in which the engine drives a pair of hydraulic pumps, each of which is connected to a hydraulic motor, one motor propelling the left drive wheel and the other motor propelling the right drive wheel. In this particular design, motion is controlled entirely by left and right squeeze levers that control the fluid flow between each of the hydraulic pumps and its respective motor. There are no brakes as such. The handles are squeezed to reverse the torque onto the drive wheels. Releasing the levers puts the mower in full forward. Also, this design mower does not default to a neutral condition, so if the operator loses control of the mower, the mower will continue to propel itself forward at full speed.

The industry has been seeking a reliable, safe extra-width walk-behind mower, with positive speed control to each drive wheel and fail-safe braking or stopping for each wheel, but such a mower has not been available.

OBJECTS AND SUMMARY OF THE INVENTION

It is an object of this invention to provide an extra-wide self-propelled lawn mower which avoids the drawbacks of the prior art.

It a more specific object of this invention to provide an extra-wide self-propelled mower with hydrostatic transmissions having both forward and reverse directions, and permitting infinitely variable speed selection from a reverse speed, through neutral, to a maximum forward speed.

It is more specific object of this invention to provide an extra-wide self-propelled mower with variable speed, reversing hydrostatic transmissions for the left and right drive wheels, which can be actuated from respective control levers positioned immediately adjacent the handle grips to permit the operator to effect speed and direction adjustment of the two drive wheels independently without moving his or her hands from the handle grips.

It is another object to provide an extra-wide self-propelled mower of this type which provides for independent control by stopping the left and right drive wheels without removing the hands from the handle grips, so that both power distribution to the wheels and braking of the wheels can be positively controlled by the operator while keeping both hands on the handle grips.

In accordance with an aspect of this invention, an extra-wide self-propelled walk-behind lawn mower has a forward extra-wide mowing deck that houses a cutting blade assembly that contains one or more rotary blades, a rear drive deck or power deck that contains an engine, e.g. a gasoline motor, a pair of drive wheels, a power train that couples the engine to the drive wheels, a power takeoff that connects the blade assembly to the engine, and a handle bar assembly attached onto the back of the mower for steering the drive wheels. The handle bar assembly has left and right hand grips to be grasped by the operator.

The mower may optionally have independent disk brakes, with respective left and right independently actuated brake levers adjacent the left and right grips of the handle bar assembly, but they are not necessary on the larger mowers.

The power train includes respective hydrostatic transmissions for the two drive wheels. Each transmission has an input shaft driven by the engine, with a drive that is connected to the left or right drive wheel. A speed regulator on each hydrostatic transmission permits adjusting the speed ratio of the output drive shaft to the input shaft within a continuous range from reverse, through neutral wherein the respective output drive shaft is idle, to maximum forward. The two speed regulators are controllable independently.

There are respective left and right speed control levers positioned on the handle bar assembly adjacent the respective grips, and connected to the speed regulators by speed control linkages to set the associated speed regulators at any desired position within their continuous ranges. This permits the operator to select a desired drive wheel speed for each drive wheel without having to release the grips of the handle bar assembly and without having to uncouple the transmission from the engine.

The control levers can favorably comprise a pair of thumb levers pivotally mounted on the handle bar assembly adjacent the respective grips. These thumb levers can be of the general design illustrated in my recent U.S. Pat. No. 4,920,734, but coupled through respective linkages to the speed control actuators of the respective hydrostatic transmissions.

The two transmissions can be mounted with a spacing between them through which can pass the drive belt for the mower blades. This eliminates the need for additional belts or jack shafts. Also, the drive pulleys for driving the two hydrostatic transmissions and the drive pulley for the belt to the mower deck can each be mounted directly on the engine output shaft. An electric clutch can be incorporated onto the latter drive pulley, so that the blades can be uncoupled from the engine.

In a preferred embodiment, there are spring returns associated with respective control linkages of the left and right hydrostatic transmissions, so that if the control levers are released, the transmissions will each be returned to a neutral position. In the neutral position, the transmission brings its associated drive wheel quickly to a halt. Each drive wheel can be independently backed up by pulling back on the respective control lever, and each drive wheel can be propelled at an independently selected forward drive speed by pressing forward on the respective control lever.

The control arrangement and lever arrangement, in combination with the twin hydrostatic transmission drive, permits the operator to mow continuously without significant fatigue, even on rolling or hilly terrain.

The above and many other objects, features, and advantages of this invention will be more fully appreciated from the ensuing detailed description of a preferred embodiment which should be read in connection with the accompanying Drawing.

DETAILED DESCRIPTION OF A PREFERRED EMBODIMENT

Figure 1:
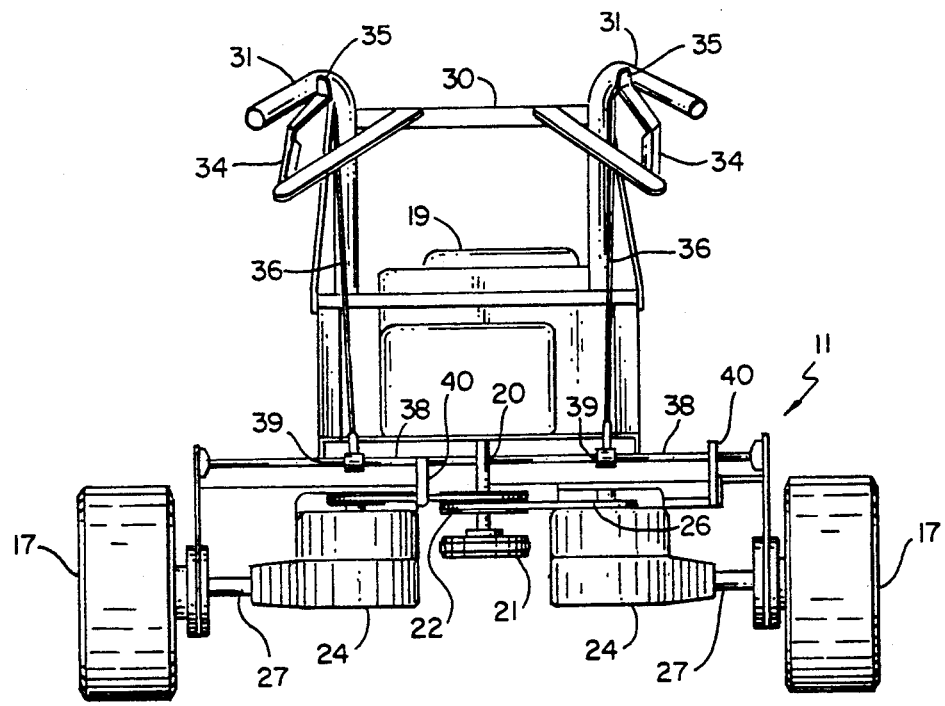
FIG. 1 is a rear elevation view of an extra-wide self-propelled power lawn mower according to a preferred embodiment of this invention.
Figure 2:
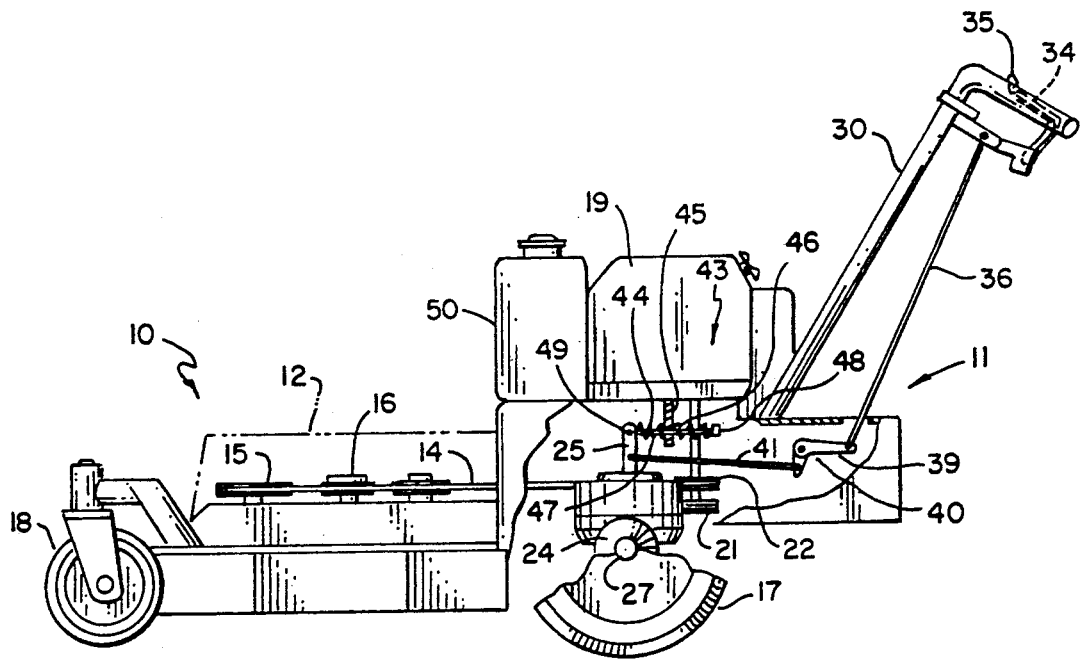
FIG. 2 is a side elevation view of the lawn mower of this embodiment, in which a portion of the power deck is cut away.
Figure 3:
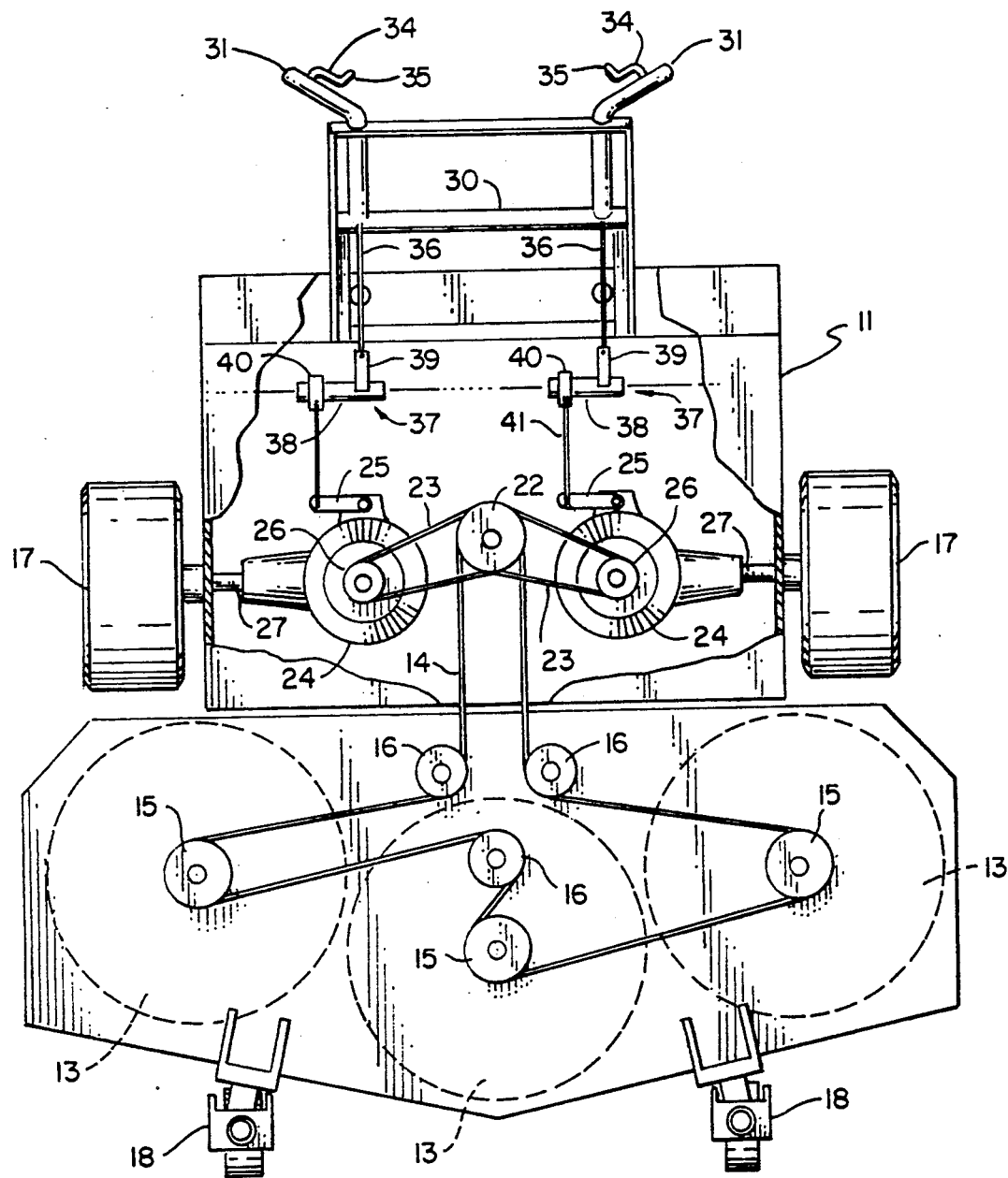
FIG. 3 is a top plan view of the lawn mower of this embodiment.

With reference to FIGS. 1-3 of the Drawing, a walk-behind power lawn mower is offered as an example to illustrate the principles of this invention.

The walk-behind rotary self-powered lawn mower has a mowing deck 10 and a power deck 11 located behind mowing deck. The mowing deck 10 can be 52 inches or 62 inches width, or can in some cases be even wider. The mowing deck 10 is surrounded by a safety skirt or shroud 12 (shown in ghost) and has three rotary blades 13, shown schematically in FIG. 3. The blades 13 are linked together by a belt drive 14, which extends from the power deck 11 and travels over a system of pulleys 15 associated with the blades 13, and a number of idler pulleys 16. A pair of drive wheels 17 are here shown with large-diameter tires preferably 18×6.50 size, or larger, and these are supported in the power deck 11. A pair of front casters 18 are mounted at the front of the power deck 10. These casters 18 preferably have foam-filled maintenance-free tires.

A gasoline engine 19, preferably a V-twin vertical-shaft industrial quality engine of twelve to eighteen horsepower, is mounted above the power deck 11. The center of gravity of the engine 19 is situated aft of the drive wheels 17 so that the weight of the engine balances the weight of the mowing deck assembly. Counter balancing the weight of the mowing deck simplifies steering and increases direction, and also eases the lifting of the mowing deck 10 when necessary to perform maintenance or to mount curbs.

The engine 19 is of the vertical type, i.e. with an output shaft 20 extending vertically downward through the power deck. The vertical shaft 20 is positioned somewhat behind the axis of the drive wheels 17. The output shaft 20 has a drive pulley 21 in which there is incorporated an electric clutchbrake, the pulley 21 driving the drive belt 14 for the blades 13. Here, the only connection between the power deck 11 and the mowing deck 10 is the single drive belt 14 that extends around the pulley 21 and then travels through the pulley 15 and 16 on the mowing deck. This simplifies aligning and mounting, and eliminates problems found on many other mowers.

Above the pulley 21 on the shaft 20 are a pair of drive pulleys 22 that are connected by respective drive belts 23 to drive a pair of hydrostatic transmissions 24, each disposed to the left and to the right of the mower, and mounted below the power deck. Each hydrostatic transmission 24 is a hydraulic transmission with a vertical input shaft and a horizontal output shaft. A pair of output levers 25 are mounted respectively on a regulator or control shaft of each of the hydrostatic transmissions 24 to permit the operator to control speed and forward/reverse sense of rotation. At the top center of each of the hydrostatic transmissions is an input pulley 26 driven by a respective one of the belts 23. An output drive shaft 27 extends laterally from each of the hydrostatic transmissions and serves as an axle for driving a respective one of the drive wheels 17. These shafts 27 are journalled in the power deck 11 behind the mowing deck 10. A handle section 30 is disposed rearward of the wheels 17 and has left and right hand grips 31 for the operator. There are left and right control levers 34 disposed on the inside of the handle section 30 adjacent the hand grips 31. These control levers 34 have curved tips 35 to facilitate actuation by the operator's thumbs to the forward position. The control levers 34 can be individually rocked forward to correspond to a forward position or rocked back to correspond to a reverse position of the respective hydrostatic transmission 24. When released, the levers 34 assume a neutral position, as explained in more detail below. In neutral, the hydrostatic transmissions serve as dynamic brakes for their respective drive wheels. These levers can be placed into any speed positions corresponding to wheel speeds, from reverse through neutral, to full forward. The control levers and the associated assembly are similar to those described in the earlier Pat. No. 4,920,734 having a common assignee.

Each of the control levers 34 has mounted thereto a rigid connecting rod 36 that extends through the power deck 11 to a respective left or right lower linkage 37 mounted below the power deck. Each of the lower linkages has a transversely mounted pivot rod 38 with a rearwardly extending pivot arm 39 that is coupled to a lower end of the connecting rod 36 and a depending pivot arm 40 that is coupled by another rigid connecting arm 41 to the actuator lever 25 of the associated hydrostatic transmission 24. Associated with each of the actuator levers 25 for the left and right hydrostatic transmissions there is a respective return spring assembly 43, one of which is shown in FIG. 2. The return spring assembly 43 is mounted beneath the power deck 11 and is arranged to urge the actuator lever 25 to a neutral position when the operator releases the associated control lever 34. In the spring return assembly 43, a rod 44 is connected to the actuator lever 25 and extends through an opening in an aperture plate 45 affixed to an under side of the power deck 11. A pair of springs 46 and 47 are disposed over the rod 44 and are biased between the plate 45 and respective stops 48 and 49 affixed proximally and distally on the rod 44. The spring that urges the rod 44 and the lever 25 from the reverse to the neutral position is preferably somewhat stiffer than the other spring that urges the rod 44 and the lever 25 from the forward to the neutral position.

Other features of this mower include a fuel tank 50 that is mounted in advance of the engine 19.

A number of other standard features have been omitted from the drawings, but would be present on the mower. These would include an ignition switch, a throttle lever for the engine 19, an automatic engine kill switch, and such other safety equipment as may be required by law or local regulation. Also, while the transmission 24 and drive wheels 17 are positioned opposite one another, in other embodiments, their positions can be staggered.

With this mower, it is unnecessary to disengage any valve to effect a directional change. The operator can control the power applied to each of the drive wheels 17 independently, by independently actuating the right and left control levers 34. Furthermore, because the operator can run one of the drive wheels forward and the other drive wheel in the reverse direction at the same time, the mower can be turned in a space not much larger than its own width. Also, because each of the drive wheels can have its speed regulated independently and can also be braked independently, the operator can control the speed and direction of the mower almost effortlessly, even when mowing across an incline where other mowers have a tendency to turn downhill.

Because the control levers seek neutral when released, the mower will come to a halt if it gets away from the operator. No elaborate operator presence switch or engine kill switch is required.

Because of the steering precision, and the much wider mowing deck than employed in other mowers, mowing time for a given lawn is significantly reduced and operator fatigue is also reduced.

Because there are no belts associated with the rear drive wheels, or disposed beneath the mowing deck, moisture will not affect the drive linkages or slow down mower operation. The heavy-duty hydrostatic transmissions 24 require little maintenance, and exhibit long life. When servicing is required, only simply hand tools and basic mechanical skills are needed, and routine maintenance requires much less time than is needed for belt driven mowers. If the mowing deck must be removed for some reason, the belt drive that connects with the engine can be easily attached and reinstalled without difficulty.

While this invention has been described in detail with respect to a single preferred embodiment, the invention certainly is not confined to that embodiment, and this invention is intended to cover many modifications and variations without departing from the scope and spirit thereof as defined in the appended claims.

What is claimed is:

1. A self-propelled mower that comprises:
   a front mower deck housing a blade assembly containing one or more movable blades,
   a rear power deck containing an engine, left and right drive wheels, and a power train coupling the engine to the drive wheels,
   power take off means for connecting the blade assembly to the engine,
   handle bar means attached to the back of the power deck for steering the drive wheels, said handle bar means having left and right grips,
   said power train further including left and right hydrostatic transmissions each having input shaft means connected to the engine, an output drive shaft connected to drive a respective one of the left and right drive wheels, and a speed regulator to set the speed ratio of the drive shaft to the associated input shaft means within a continuous range from reverse, through neutral, wherein the associated output drive shaft is idle, to maximum forward; and
   left and right speed control means positioned on the handle bar means and operatively connected to the respective left and right transmission speed regulators, each said speed control means including a respective speed control linkage for setting the associated speed regulator at any desired position within the continuous range so that the operator can select a desired drive wheel speed for the associated drive wheels without releasing the handle bar means or uncoupling the transmission from the engine, said control means including respective left and right speed control levers mounted on said handle bar means respectively adjacent said left and right grips for rocking motion about a transverse axis, and with said left and right speed control linkages connecting said left and right speed control levers to the associated regulators to permit an operator to control the speed and direction of motion of each said drive wheel independently, said speed control levers including thumb levers arranged adjacent said grips and each being urged forward and urged rearward by the operator to place the respective transmission into a forward or reverse speed, respectively, so that the operator can adjust the speed and direction of each of the two drive wheels independently without removing his or her hands from the grips, and said linkages each including neutral seeking means to set the respective transmission into neutral when the operator's hand is released from the respective control lever.

2. The mower of claim 1 wherein each of said speed control linkages includes a pivot rod that is transversely mounted below the mower deck, first and second pivot arms that extend from said pivot rod, said first pivot arm being coupled by a rigid connecting rod to the associated one of the left and right speed control levers, the second pivot arm being connected by a rigid connecting member to the speed regulator of the associated one of said left and right hydrostatic transmissions, so that the motion of said speed control levers rotates the associated pivot rod and moves the associated speed regulator to a desired speed setting independently of the speed setting established for the other of the speed regulators.

3. The mower of claim 1 wherein each said speed control linkage includes respective resilient spring biasing means for urging said speed regulator to said neutral position, so that the respective hydrostatic transmission reverts to its neutral position when the operator releases the associated control lever.

4. The mower of claim 3 wherein each said resilient spring biasing means includes a rigid member attached to the speed regulator, a plate mounted on the power deck through which said rigid member passes, and a pair of springs biasing against said plate and against stops on said rigid member for respectively urging the regulator from a forward position to the neutral position and from a reverse position to the neutral position.

5. The mower of claim 1 wherein said engine has a vertical output shaft that extends downward through a central portion of said rear power deck; said power train includes belt drive means to power the input shaft means of said hydrostatic transmissions, said belt drive means including at least one pulley mounted on said vertical output shaft, and said power take-off means includes blade drive belt means for powering said blade assembly said blade drive belt means including a drive pulley mounted o said output drive shaft.

6. The mower of claim 5 wherein said drive pulley includes an electric clutch for selectively coupling the blade drive belt means to said engine vertical output shaft.

7. The mower of claim 6 wherein said left and right hydrostatic transmissions are mounted on said power deck respectively to the left and right of the central portion of the power deck and forward of said engine vertical drive shaft, defining a clearance between the left and right hydrostatic transmissions, and said blade drive belt means includes a single drive belt extending from said drive pulley and through the clearance between said left and right hydrostatic transmissions to blade drive pulleys on said mower deck.

* * * * *